(12) United States Patent
Jiang

(10) Patent No.: US 11,888,940 B2
(45) Date of Patent: Jan. 30, 2024

(54) INTELLIGENT LIGHTING CONTROL SYSTEM

(71) Applicant: SIGNIFY HOLDING B.V., Eindhoven (NL)

(72) Inventor: Xiaobo Jiang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/015,366

(22) PCT Filed: Jul. 15, 2021

(86) PCT No.: PCT/EP2021/069769
§ 371 (c)(1),
(2) Date: Jan. 10, 2023

(87) PCT Pub. No.: WO2022/017908
PCT Pub. Date: Jan. 27, 2022

(65) Prior Publication Data
US 2023/0308513 A1    Sep. 28, 2023

(30) Foreign Application Priority Data

Jul. 23, 2020   (WO) ................ PCT/CN2020/103788
Oct. 16, 2020   (EP) ..................................... 20202286

(51) Int. Cl.
*H04L 67/12*     (2022.01)
*H05B 47/19*     (2020.01)

(52) U.S. Cl.
CPC ............. *H04L 67/12* (2013.01); *H05B 47/19* (2020.01)

(58) Field of Classification Search
CPC ................................ H04L 67/12; H05B 47/19
See application file for complete search history.

(56) References Cited

U.S. PATENT DOCUMENTS 10,659,919 B1 *   5/2020   Li ...................... H04L 61/5038
2009/0002981 A1   1/2009   Knibbe
(Continued)

FOREIGN PATENT DOCUMENTS

EP    2957150 B1    12/2015
EP    3092870 A1    11/2016
(Continued)

OTHER PUBLICATIONS http://www.movable-type.co.uk/scripts/latlong.html—Retrieved Jan. 10, 2023.

*Primary Examiner* — Chris Parry
*Assistant Examiner* — Steven C Nguyen

(57) ABSTRACT

The invention relates to central controller (3) for remote communication with a plurality of network controllers, NC, (20) the plurality of NCs (20) being provided in communication nodes (2a, 2b, 2c, 2d) and being configured for near field communication with each other, the central controller (3) being configured to be in communicative connection with each NC of the plurality of NCs. The central controller (3) comprises a data processing device (32) configured to receive ID and position information and a list of communicable neighboring NCs from each NC (20), based on the received ID information, position information and lists of communicable neighboring NCs identify at least one NC of the plurality of NCs as providing accurate position information and use the thus identified NC as an anchor point NC (20a), and identify missing and/or position drifting NCs by analyzing the received ID and position information and lists of communicable neighboring NCs. The invention further relates to a lighting control system (1) comprising such a central controller (3).

12 Claims, 4 Drawing Sheets

(56) References Cited

U.S. PATENT DOCUMENTS

| | | | |
|---|---|---|---|
| 2011/0026434 A1* | 2/2011 | Van Der Stok | G01S 5/0289 |
| | | | 370/254 |
| 2012/0059622 A1* | 3/2012 | Cacace | H04L 41/12 |
| | | | 702/150 |
| 2016/0204859 A1 | 7/2016 | Schenk et al. | |
| 2020/0329341 A1* | 10/2020 | Kuber | H04W 4/023 |

FOREIGN PATENT DOCUMENTS

| | | |
|---|---|---|
| WO | 2012016337 A1 | 2/2012 |
| WO | 2012032725 A1 | 3/2012 |
| WO | 2014126470 A1 | 8/2014 |
| WO | 2016032379 A1 | 3/2016 |

\* cited by examiner

INTELLIGENT LIGHTING CONTROL SYSTEM

CROSS-REFERENCE TO PRIOR APPLICATIONS

This application is the U.S. National Phase application under 35 U.S.C. § 371 of International Application No. PCT/EP2021/069769, filed on Jul. 15, 2021, which claims the benefit of European Patent Application No. 20202286.9, filed on Oct. 16, 2020, and Chinese Patent Application No. PCT/CN2020/103788, filed on Jul. 23, 2020. These applications are hereby incorporated by reference herein.

FIELD OF THE INVENTION

The invention relates to a central controller for remote communication with a plurality of network controllers, NC, the plurality of NCs being provided in communication nodes, the central controller being configured to be in communicative connection with each NC of the plurality of NCs, and the central controller comprises a data processing device.

The invention also relates to a lighting control system comprising a plurality of communication nodes and a plurality of node controllers, NCs, where each communication node comprises an NC, and a central controller configured to be in communicative connection with each NC of the plurality of NCs. Optionally, the outdoor lighting control system may further comprise a front-end unit.

By "communicatively connected" as used herein is generally understood any connection through which the units of the outdoor lighting control system, particularly the NCs of the communication nodes of the plurality of communication nodes, the central controller and the front-end unit, may communicate to exchange data with each other. Such connections are most commonly wireless, such as over a suitable network, but may in principle also be wired.

By "communicable" as used herein is generally understood an NC with which it is possible for another NC and the central controller to communicate.

US2020329341A1 discloses an example luminaire-based positioning system calculating a respective distance between an uncommissioned luminaire to each of neighboring commissioned luminaires based on a respective received signal strength indicator (RSSI) measurement. Based on the calculated respective distance to each of the neighboring commissioned luminaires and a set of commissioned location coordinates of each of the neighboring commissioned luminaires, luminaire-based positioning system estimates a set of uncommissioned location coordinates of the uncommissioned luminaire. The luminaire-based positioning system determines a best fit assignment of the set of uncommissioned location coordinates of uncommissioned luminaires in an uncommissioned luminaire list to the set of commissioned location coordinates of non-operational commissioned luminaires in a non-operational luminaire list. The luminaire-based positioning system adjusts a luminaire node map for each of the non-operational commissioned luminaires based on the determined best fit assignment.

US2011026434A1 discloses a node detection system including an array of nodes (510), wherein each node of the array of nodes (510) has at least at least two, three or four directional antennas (530) configured to have antenna beams in as many directions. The range of each antenna is limited to reach a neighboring operational node of the array of nodes (510) for transmission of a message to the neighboring operational node. A controller (550) is configured to receive messages from the array of nodes (510) and determine the location of each node based on the messages.

US2012059622A1 discloses a street light monitoring system having a small fraction of the street lights in the system being anchor nodes that are configured to detect and store their own actual fixed position, thereby acting as reference points. Further, the other street lights are referred to as blind nodes and do not have their actual fixed position but can derive their position using the coordinates of the anchor nodes and estimating their distance to them. The distance estimation for any blind node can be performed using a received signal strength indication (RSSI) measured at the respective blind node for small distances of up to a threshold value and a link quantization technique takes advantage of the typical placement of the street lights. Inferred distances between the street lights can be assigned to pre-determined categories of distances for a coarse estimation and further position adjustment to a closest possible "real" position.

EP2957150A1 discloses a lighting control system and method for association of nodes in a multi-node network. The system comprises a number of lighting nodes forming a multi-node network, each lighting node comprising: —a light source; —a controller connected to the light source; and —communication means connected to the controller, wherein the lighting control system further comprises: —a memory component adapted to store information relating to at least one group of interrelated coordinates defined in a geographical coordinate system; and —a processing component in communication with the lighting nodes and adapted to automatically associate at least one lighting node with the at least one group on the basis of the geographical location of said at least one lighting node.

BACKGROUND OF THE INVENTION

For intelligent lighting systems commissioning is an important process. Commissioning enables collecting necessary information to identify a device, typically a luminaire, in the field, to enable the network communication securely and to locate the device and show its reported properties.

In the outdoors, commissioning includes collecting the GPS location and information of a connected luminaire, as well as a unique ID information and factory setting of control gear, such as an Outdoor luminaire Controller (OLC).

For instance, U.S. Pat. No. 10,659,919 B1 discloses methods and systems for the automated commissioning of a network of electronic devices such as to rapidly determine the locations of large systems of installed electronic devices equipped with wireless communication modules, such as luminaires, light switches, and occupancy sensors, by using inter-device distance measurements to calculate the location coordinates of the devices. Increased confidence in the calculated location coordinates can be achieved by comparing the calculated values to an installation plan and assigning the IDs of the specific devices to the location coordinates in the installation plan.

Presently, auto-commissioning is the trend. Auto-commissioning offers the feature of plug and play, such that the installer does not need to use another tool, such as a scanner for scanning a bar code or QR code, to retrieve and input necessary information into the intelligent lighting system.

However, due to complex situations often prevailing in real projects, one may encounter issues that will cause that a luminaire controller (LC), such as an OLC, does not report its location or reports an incorrect location with a considerable amount of position drift. Device management will under such circumstances be difficult or impossible.

For instance, the following such scenarios may occur. The OLC's GPS location may drift due to bad satellite view, or interference caused by nearby buildings, the latter particularly being an issue in cities. The GPS module of the OLC may be broken. The remote communication between the OLC and a back-end unit, such as GPRS/NB-IOT, may fail or may not be properly commissioned at the operator.

Missing or incorrectly reported locations of OLCs and thus luminaires may cause several unwanted issues for users of the lighting systems. For instance, the OLC and linked luminaire may not show up on the user interface, UI, such that the luminaire seems to be missing to the user. The OLC and linked luminaire may show up at a wrong location, such that the luminaire seems to be mis-located to the user. Possibly, the user may not even be aware of that a luminaire is missing, and/or the user may not be able to identify a mis-located luminaire and find them in the field.

Therefore, there is a desire to address the above problems, and to provide a lighting control system which enables finding missing NCs and thus missing communication nodes, identify position drifting NCs, and provide a field team with an alert as well as a rough location of missing or position drifting NC, such that on-site service may be called upon to check missing or position drifting NC.

SUMMARY OF THE INVENTION

It is an object of the present invention to overcome this problem, and to provide a lighting control system which enables finding missing NCs and thus missing communication nodes, identify position drifting NCs, and provide a field team with an alert as well as a rough location of missing or position drifting NC, such that on-site service may be called upon to check missing or position drifting NC.

According to a first aspect of the invention, this and other objects are achieved by means of a central controller for remote communication with a plurality of network controllers, NC, the plurality of NCs being provided in communication nodes and being configured for near field communication with each other, the central controller being configured to be in communicative connection with each NC of the plurality of NCs, where the central controller comprises a data processing device configured to receive ID information, position information and a list of communicable neighboring NCs from each NC of the plurality of NCs, based on the received ID information and position information and the received lists of communicable neighboring NCs identify at least one NC of the plurality of NCs as providing accurate position information and use the thus identified NC as an anchor point NC, and identify missing and/or position drifting NCs by analyzing the received ID information and position information and the received lists of communicable neighboring NCs.

Thereby, and in particular by providing that the central controller is configured as described above, an outdoor lighting control system is provided with which missing NCs, and thus missing communication nodes, may be found, and position drifting NCs, and thus position drifting communication nodes, may be identified. This in turn enables the provision of a user or field team with an alert as well as a rough location of missing or position drifting NC, such that on-site service may be called upon to check on the identified missing or position drifting NCs.

Also, central controller is thereby provided with which all missing NCs and thus missing communication nodes, may be found, and all position drifting NCs, and thus position drifting communication nodes, may be identified in a more efficient and precise manner leaving no NCs and thus communication nodes unaccounted for.

In an embodiment the data processing device of the central controller is further configured to receive the ID information, the position information and the precision information and the list of communicable neighboring NCs from each NC of the plurality of NCs, based on the received ID information, position information and precision information and the received lists of communicable neighboring NCs identify at least one NC of the plurality of NCs as providing accurate position information and use the thus identified NC as an anchor point NC, and identify missing and/or position drifting NCs by analyzing the received ID information, position information and precision information and the received lists of communicable neighboring NCs.

By providing that the central controller is further configured to receive precision information from the NCs as described above, an outdoor lighting control system is provided with which all missing NCs and thus missing communication nodes, may be found, and all position drifting NCs, and thus position drifting communication nodes, may be identified in a more efficient and precise manner, and with which the user or field team called upon to service the missing or position drifting NCs may be provide with a more accurate location of the missing or position drifting NCs.

In an embodiment the central controller further is configured to control the NC identified and used as anchor point NC to allow one, two or three hops.

In this connection it is noted that a hop is intended to be understood as message exchange between adjacent nodes with no intermediate node(s) on the communication path, i.e. no message routing takes place.

By allowing the anchor point NC to make one, two or three hops, more father neighboring NCs are taken into consideration without unduly diluting the precision information that the anchor point NC can obtain for the neighboring NCs. Allowing the anchor point NC to make hops may also increase the probability of finding a missing NC.

In an embodiment the position information comprises any one or more of a longitude and a latitude, a GPS location and a location ID of an NC.

Thereby, the position of an NC may be given or stated with a high degree of precision.

In an embodiment the precision information comprises any one or more of a Received Signal Strength Indicator (RSSI) between the anchor point and a neighboring NC, a number of satellites visible to the NC and a signal-to-noise ratio (SNR).

Thereby, an accurate measure of the precision of the position information is provided.

In an embodiment the data processing device of the central controller is configured to identify missing NCs by maintaining a list of reporting NCs, maintaining a further list of NCs based on the received lists of communicable neighboring NCs and crosschecking the list and the further list to identify NCs appearing only in the further list and thereby indicating missing or not reporting NCs.

Thereby any missing NC may be identified accurately in a simple, efficient and fast manner.

In an embodiment the data processing device of the central controller is further configured to use the anchor point NC to estimate the location of a missing NC.

Thereby an estimate of the location of a missing NC may be provided to the user or field team called upon to service the missing or position drifting NCs.

In an embodiment estimating the location of the missing NC comprises making an NC having the missing NC as a neighboring NC the center of a virtual circle, determine the periphery of the virtual circle, and deeming the periphery the area of the position of the missing NC.

In an embodiment estimating the location of the missing NC comprises making two or more NCs having the missing NC as a neighboring NC the center of a respective virtual circle, determine the overlap area of the said respective virtual circles, and deeming the determined overlap area the area of the position of the missing NC.

Thereby the estimate of the location of a missing NC provided to the user or field team called upon to service the missing or position drifting NCs is provided with a high degree of accuracy making it particularly easy for the user or field team to locate the missing communication node in the field. Using two or more NCs to this end increases the accuracy of the location estimate.

In an embodiment the data processing device of the central controller is further configured to identify a position drifting NC by requesting and receiving updated position information, precision information and list of communicable neighboring NCs from each NC of the plurality of NCs, retrieving near-field settings and local communication range of each NC of the plurality of NCs, selecting at least one NC in the list of communicable neighboring NCs of the anchor point NC, calculating the distance of at least one NC in the list of communicable neighboring NCs to the anchor point NC, determining whether the calculated distance of the at least one NC is smaller than the local communication range of the at least one NC, and if the calculated distance of the at least one NC is not smaller than the local communication range of the at least one NC determining that the at least one NC is position drifting.

Thereby a source of error otherwise present in the estimate of the location of a missing NC provided to the user or field team called upon to service the missing or position drifting NCs is removed such that the said estimate is provided with a particularly high degree of accuracy making it particularly easy for the user or field team to locate the missing communication node in the field.

In an embodiment the central controller is further configured to trigger a warning or alarm on an NC identified as missing or position drifting.

Thereby, the user or field team may be alerted of a missing or position drifting NC without delay, which ensures a faster and more efficient maintenance of the lighting system.

In an embodiment the central controller is further configured to control each NC to provide the list of communicable neighboring NCs to the central controller.

Thereby, a quicker process is enabled, by which the identification process may be controlled on demand and centrally, and with which it is not necessary to await the NCs responding according to a predetermined schedule.

In an embodiment the outdoor lighting control system further comprises a front-end unit, and the central controller is further configured to cause the front-end unit to trigger a warning or alarm on an NC identified as missing or position drifting.

Thereby, the user or field team may be alerted of a missing or position drifting NC directly and without delay, which ensures a particularly fast and efficient maintenance of the lighting system.

In an embodiment, the central controller may be a back-end unit, communication nodes may be luminaires and the NCs may be luminaire controllers, LCs. The LCs may be outdoor luminaire controllers, OLCs, or indoor luminaire controllers, ILCs. The luminaires may be outdoor luminaires or indoor luminaires.

In a second aspect of the invention, the above and other objects are achieved by means of a lighting control system comprising a plurality of communication nodes and a plurality of node controllers, NC, each communication node of the plurality of communication nodes comprising an NC of the plurality of NCs, and a central controller according to the first aspect of the invention.

In an embodiment each NC of the plurality of NCs is configured for remote communication with the central controller, and near field communication with other NCs of the plurality of NCs, where each NC of the plurality of NCs further is configured to receive ID information and position information from neighboring NCs of the plurality of NCs by near field communication, based on the received ID information and position information, keep a list of communicable neighboring NCs, provide the list of communicable neighboring NCs to the central controller by remote communication, and provide ID information and position information relating to the NC itself to the central controller by remote communication.

In an embodiment, each NC of the plurality of NCs is further configured to receive precision information from neighboring NCs of the plurality of NCs by near field communication, based on the received ID information and position information, keep the list of communicable neighboring NCs, provide the list of communicable neighboring NCs to the central controller by remote communication, and provide ID information, position information and precision information relating to the NC itself to the central controller by remote communication.

Thereby, an outdoor lighting control system is provided with which NCs or the plurality of communication nodes may communicate with each other, and with which the information necessary for enabling the central controller to identify missing and/or position drifting NCs, and thus missing communication nodes, may thus be provided to the central controller in a particularly simple and efficient manner.

In an embodiment each NC of the plurality of NCs comprises a first communication module configured for remote communication with the central controller, a second communication module configured for near field communication with other NCs of the plurality of NCs, and a microcontroller unit, and the microcontroller unit of each NC of the plurality of NCs is configured to by means of the first communication module receive ID information, position information and precision information from neighboring NCs of the plurality of NCs by means of near field communication, based on the received ID information, position information and precision information, keep a list of communicable neighboring NCs, and by means of the second communication module provide the list of communicable neighboring NCs as well as ID information, position information and precision information relating to the NC itself to the central controller.

Thereby, an outdoor lighting control system is provided which has a simple structure being easy and relatively cheap to manufacture, and with which the above advantages may be obtained in a particularly simple manner.

In an embodiment at least one NC of the plurality of NCs is configured to support near field communication with other NCs of the plurality of NCs located within a distance of at least 90 m or at least 300 m.

Considering the common distances between communication nodes, and thus NCs, in an outdoor lighting system, such a near field communication range has been shown to allow for the NC to find a sufficient number of neighboring NCs to efficiently achieve the above-described advantages, even when considering crosses and signal loss in the communication. By way of example, it can be mentioned that the standard distance between communication nodes in street light systems is 30 m.

In a third aspect of the invention, the above and other objects are achieved by means of a method for identifying missing and/or position drifting network controllers, NCs, by means of a central controller for remote communication with a plurality of network controllers (NC), the plurality of NCs being provided in communication nodes and being configured for near field communication with each other, the central controller being configured to be in communicative connection with each NC of the plurality of NCs, where the central controller comprises a data processing device configured to perform the steps of receiving ID information, position information and a list of communicable neighboring NCs from each NC (20) of the plurality of NCs, based on the received ID information and position information and the received lists of communicable neighboring NCs identifying at least one NC of the plurality of NCs as providing accurate position information and using the thus identified NC as an anchor point NC (20a), and identifying missing and/or position drifting NCs by analyzing the received ID information and position information and the received lists of communicable neighboring NCs.

In an embodiment, the data processing device of the central controller is further configured to perform the steps of receiving the ID information, the position information and precision information and the list of communicable neighboring NCs from each NC of the plurality of NCs, based on the received ID information, position information and precision information and the received lists of communicable neighboring NCs identifying at least one NC of the plurality of NCs as providing accurate position information and using the thus identified NC as an anchor point NC, and identifying missing and/or position drifting NCs by analyzing the received ID information, position information and precision information and the received lists of communicable neighboring NCs.

In an embodiment, the central controller further is configured to perform any one or more of the steps of controlling the anchor point NC to allow one, two or three hops, controlling each NC to provide the list of communicable neighboring NCs to the central controller, and triggering a warning or alarm on an NC identified as missing or position drifting.

In an embodiment, the data processing device of the central controller is configured to identify missing NCs by performing the steps of maintaining a list of reporting NCs, maintaining a further list of NCs based on the received lists of communicable neighboring NCs, and crosschecking the list and the further list to identify NCs appearing only in the further list and thereby indicating missing or not reporting NCs.

In an embodiment, the data processing device of the central controller is further configured to use the anchor point NC to estimate the location of a missing NC.

In an embodiment, estimating the location of the missing NC comprises the steps of making an NC having the missing NC as a neighboring NC the center of a virtual circle, determine the periphery of the virtual circle, and deeming the periphery the area of the position of the missing NC, or making two or more NCs having the missing NC as a neighboring NC the center of a respective virtual circle, determine the overlap area of the said respective virtual circles, and deeming the determined overlap area the area of the position of the missing NC.

In an embodiment the data processing device of the central controller is further configured to identify a position drifting NC by performing the steps of:

requesting and receiving updated position information, precision information and list of communicable neighboring NCs from each NC of the plurality of NCs, retrieving near-field settings and local communication range of each NC of the plurality of NCs, select at least one NC in the list of communicable neighboring NCs of the anchor point NC, calculate the distance of at least one NC in the list of communicable neighboring NCs to the anchor point NC, determine whether the calculated distance of the at least one NC is smaller than the local communication range of the at least one NC, and if the calculated distance of the at least one NC is not smaller than the local communication range of the at least one NC determine that the at least one NC is position drifting.

In a fourth aspect of the invention, the above and other objects are achieved by means of a method for identifying missing and/or position drifting network controllers, NCs, by means of a lighting control system comprising a plurality of communication nodes and a plurality of node controllers, NC, each communication node of the plurality of communication nodes comprising an NC of the plurality of NCs, and a central controller according to the first aspect of the invention, wherein the central controller comprises a data processing device configured to perform the steps of the method according to the third aspect of the invention.

In an embodiment, each NC of the plurality of NCs is configured for remote communication with the central controller, and near field communication with other NCs of the plurality of NCs, and each NC of the plurality of NCs further is configured to perform the steps of:

receiving ID information and position information from neighboring NCs of the plurality of NCs by near field communication, based on the received ID information and position information, keeping a list of communicable neighboring NCs, providing the list of communicable neighboring NCs to the central controller by remote communication, and providing ID information and position information relating to the NC itself to the central controller by remote communication.

In an embodiment, each NC of the plurality of NCs is further configured to perform the steps of:

receiving precision information from neighboring NCs of the plurality of NCs by near field communication, based on the received ID information and position information, keeping the list of communicable neighboring NCs, providing the list of communicable neighboring NCs to the central controller by remote communication, and providing ID information, position information and precision information relating to the NC itself to the central controller by remote communication.

In an embodiment, each NC of the plurality of NCs comprises a first communication module configured for remote communication with the central controller, a second communication module configured for near field communication with other NCs of the plurality of NCs, and a microcontroller unit, and the microcontroller unit of each NC of the plurality of NCs is configured to perform the steps of:

by means of the first communication module receiving ID information, position information and precision information from neighboring NCs of the plurality of NCs by means of near field communication, based on the received ID information, position information and precision information, keeping a list of communicable neighboring NCs, and by means of the second communication module providing the list of communicable neighboring NCs as well as ID information, position information and precision information relating to the NC itself to the central controller.

In a fifth aspect of the invention, the above and other objects are achieved by means of a computer program product comprising instructions for any one or more of implementing a method according to the third aspect of the invention and implementing a method according to the fourth aspect of the invention.

The invention further relates to a lighting system comprising a lighting control system according to the invention. Such a lighting system may be an outdoor lighting system, such as a street lighting system, a park lighting system, a parking area lighting system or a garden lighting system. Such a lighting system may also be an indoor lighting system, such as an office lighting system, a domestic lighting system and a public building lighting system.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
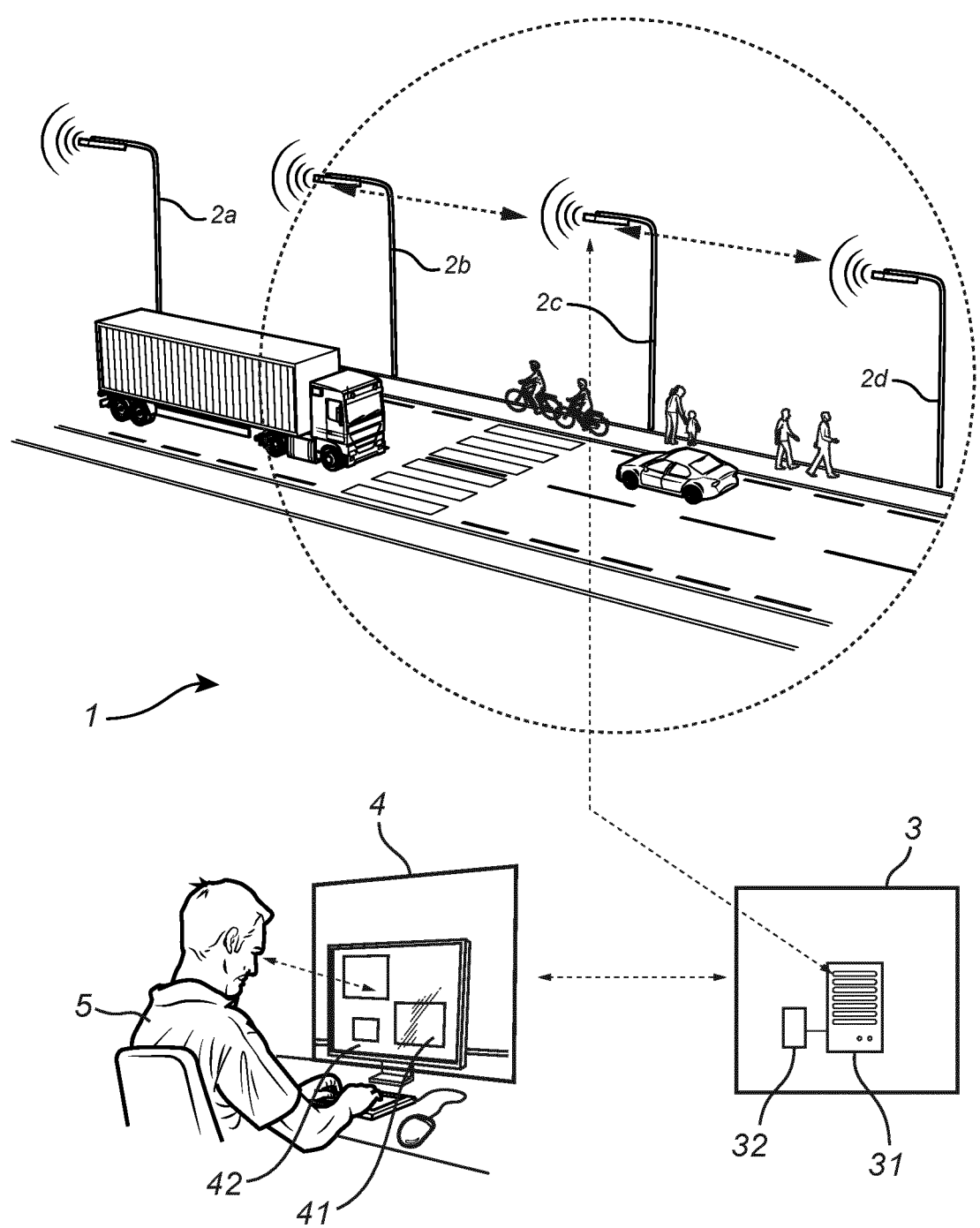
FIG. 1 shows a schematic diagram illustrating a lighting control system according to the invention comprising a plurality of communication nodes each comprising a node controller, NC.

FIG. 1 shows a lighting control system 1 according to the invention. The lighting control system 1 generally comprises a plurality of communication nodes 2a, 2b, 2c, 2d and a central controller 3 to which each communication node of the plurality of communication nodes 2a, 2b, 2c, 2d are connected communicatively. The lighting control system 1 may further generally comprise a front-end unit 4 connected communicatively to the central controller 3. In the embodiment shown in FIG. 1, the communication nodes 2a, 2b, 2c, 2d are luminaires. The lighting control system 1 may be an outdoor lighting control system 1 or an indoor lighting control system 1.

The front-end unit 4 comprises a user interface 41, such as a keyboard or a touch screen, through which a user 5 may interact with the front-end unit 4. Thereby, manual operation of the lighting control system 1 becomes possible. The front-end unit 4 further comprises a communication module 42 for enabling data communication with the central controller 3. The front-end unit 4 may for instance be a mobile phone, a laptop computer or a tablet computer with a suitable application.

The central controller 3 comprises a communication module 31 for enabling data communication with the front-end unit 4 on the one hand and with each of the communication nodes of the plurality of communication nodes 2a, 2b, 2c, 2d on the other hand. The central controller 3 further comprises a data processing device 32 for processing and analyzing information or data received through the communication module 31. The data processing device 32 may be a separate unit or it may form part of the communication module 31. The central controller 3 may be a back-end unit, such as a back-end unit of a lighting system.

The communication module 31 of the central controller 3 and the communication module 41 of the front-end unit 4 are both configured for remote communication. Such remote communication may for instance be via satellite or the internet or suitable wide area networks (WAN). Such remote communication may for instance be by means of protocols such as Narrowband Internet of Things (NBIOT), General Packet Radio Service (GPRS), 3G, 4G, 5G or Long Range (LoRa).

Figure 2:
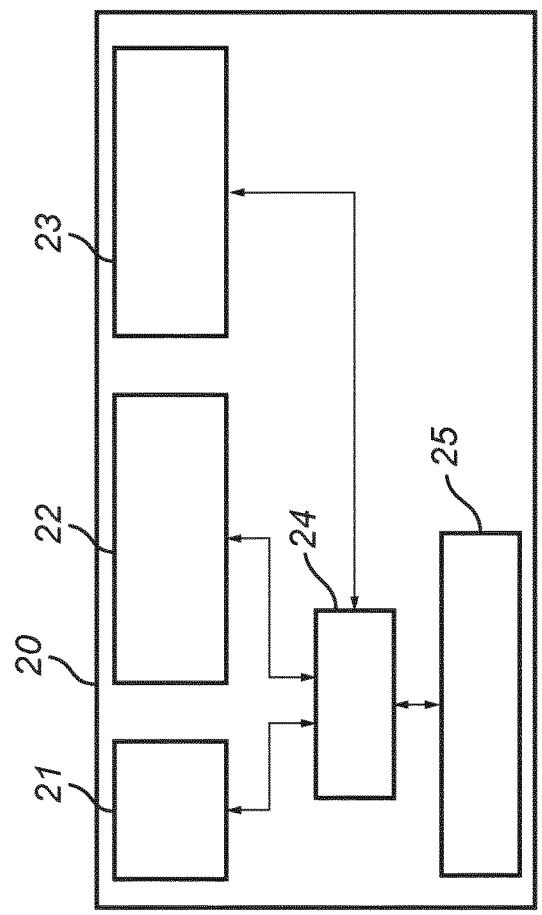
FIG. 2 shows a schematic diagram of an NC.

The communication nodes of the plurality of communication nodes 2a, 2b, 2c, 2d each comprise a node controller, NC, 20, which is illustrated schematically in FIG. 2. The NCs 20 may be luminaire controllers, LCs, such as Outdoor Luminaire Controllers (OLC) or Indoor Luminaire Controllers (ILC). The communication nodes of the plurality of communication nodes 2a, 2b, 2c, 2d further each comprise suitable lighting hardware 25. By way of example, the plurality of communication nodes 2a, 2b, 2c, 2d may be a group of street lamps, parking area lamps or other outdoor lamps or communication nodes.

The NC 20 of each communication node generally comprises a GPS module 21, a first communication module 22, a second communication module 23, and a microcontroller unit (MCU) 24.

The GPS module 21, the first communication module 22 and the second communication module 23 are connected to the MCU 24 such that the MCU 24 may receive data or information from the GPS module 21, the first communication module 22 and the second communication module 23, and optionally also such that the MCU 24 may send data, information or requests for information to the GPS module 21, the first communication module 22 and the second communication module 23. The MCU 24 thus controls each of the GPS module 21, the first communication module 22 and the second communication module 23. The MCU is furthermore connected to the lighting hardware 25 of the communication node. The MCU 24 is thus also configured to control the lighting hardware 25, particularly in reaction to information or control signals received from the central controller 3 via the first communication module 22.

The GPS module 21 is configured to enable the communication node 2a, 2b, 2c, 2d to perform self-position localization. Thereby, after the communication node is powered up, the NC 20 may update its location information from the GPS module 21. The location information may include position information, such as a latitude and a longitude or GPS coordinates, and precision information, such as a Received Signal Strength Indicator (RSSI), a number of visible satellites or a signal-to-noise ratio (SNR). The SNR may be a SNR of a GPS signal or of another signal indicating the position of the NC 20. The NC 20 may in this way state its location with the best possible precision. The NC 20 may in this way further update its location continuously or with predetermined intervals. Position information is thus absolute location information and precision information is relative location information.

The first communication module 22 is configured for remote communication, and thus for communication with the central controller 3. Such remote communication may for instance be via satellite or the internet or suitable wide area networks (WAN). Such remote communication may for instance be by means of protocols such as Narrowband Internet of Things (NBIOT), General Packet Radio Service (GPRS), 3G, 4G, 5G or Long Range (LoRa).

The second communication module 23 is configured for near field communication. The second communication module 23 enables the NC 20, and thereby the communication node comprising the NC 20, to communicate with other communication nodes with an NC 20 comprising a communication module configured for near field communication and being within the range of the second communication module 23. Such near field communication may for instance be via suitable local area networks (LAN) or Personal Area Networks (PAN) or other nearfield communication technologies such as ZigBee, Bluetooth etc. Such remote communication may for instance be by means of protocols such as IPv6 over Low-Power Wireless Personal Area Networks (6LoWPAN).

Using the second communication module 23, the NC 20 may thus communicate with nearby NCs. Thereby, the NCs may exchange their unique ID information and their location information. The location information may include absolute location information or position information, such as GPS coordinates, and relative location information or precision information, such as a RSSI between the NC 20 and the nearby NC with which the NC 20 communicates. In this way it is enabled that each NC may maintain a list of communicable neighbor NCs, i.e. neighbor NCs with which data communication is possible.

Figure 3:
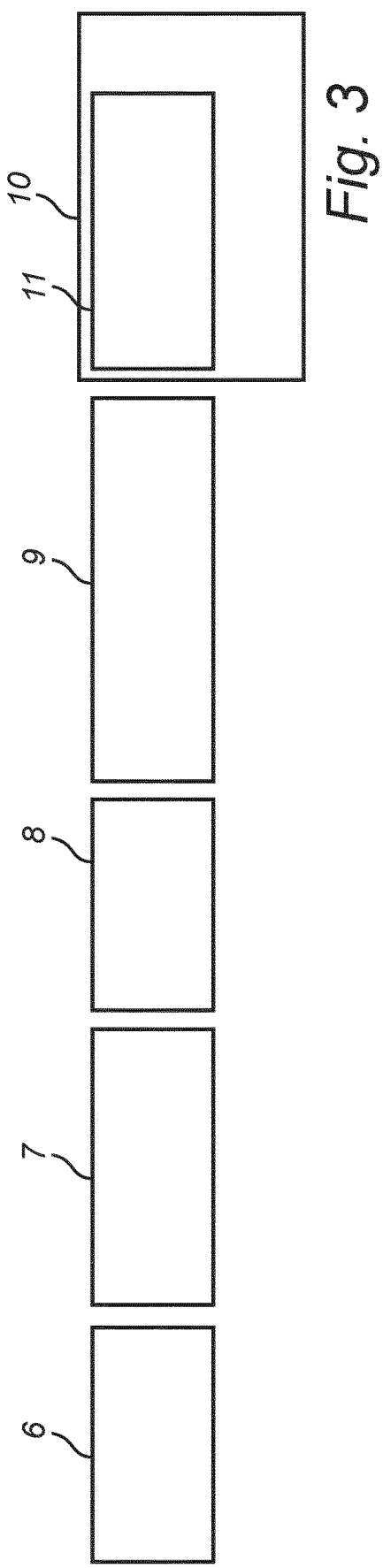
FIG. 3 shows a block diagram illustrating the various types of information exchanged in a lighting control system according to the invention.

In practice, and as illustrated in FIG. 3, the process of discovering neighbor NCs starts with the NC 20 broadcasting a discovery message to all NCs within communication range of the second communication module 23. The discovery message comprises a request for the receiving NC's unique ID information 6 and location information 8, such as a latitude and a longitude. The discovery message may further comprise a request for the receiving NC's precision information 9, such as satellites in view or a SNR, and information 7, such as a communication node asset information block, regarding the communication node 2, and particularly its hardware assets, to which the receiving NC belongs. The discovery message may be encrypted to make sure the receiving NCs are not faked but are in fact real NCs.

In reply receiving NCs will thus respond with its ID information 6 and location information 8, as well as where requested its precision information 9 and hardware asset information 7 regarding the communication node 2 to which the receiving NC belongs. Based on the thus received information 6, 7, 8 and 9, the NC 20 compiles a list 10 of communicable neighbor NCs. The list comprises an entry 11 for each communicable neighbor NC. The entry 11 comprises the unique ID 6 and the location information 8 of the NC. The entry 11 may optionally further comprise the precision information 9 and the hardware asset information 7.

Alternatively, each NC may broadcast its location information in certain pre-determined intervals. Thereby, any other NC may receive the broadcast information, and may add it into its neighborhood list such as to update the list with the pre-determined intervals.

This process may be repeated continuously or with pre-determined time intervals to keep the list 10 updated.

Upon completion of the list 10, the NC 20 will report its location and list 10 of communicable neighbor NCs to the central controller 3 using the first communication module 22.

In this way the central controller 3 receives a list 10 from each NC 20 of the communication nodes of the plurality of communication nodes 2a, 2b, 2c, 2d. The central controller 3 is also configured to process the thus received data. The data processing of the central controller 3 will be described further below.

Optionally, the central controller 3 may also trigger a process of discovering neighbor NCs as described above and the report of resulting lists 10 to the central controller 3 by sending commands to the NCs. The central controller 3 may also adjust the near field communication parameters of the NCs to assist and optimize the discovery process. Near field communication parameters may include message hops, radio transmission power and the like.

Figure 4:
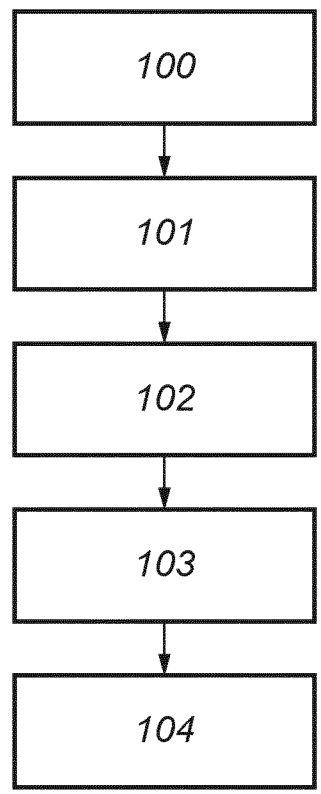
FIG. 4 is a process diagram illustrating an embodiment of the steps for identifying a missing NC among the plurality of NCs.

Now, referring to the process diagram of FIG. 4, a method for identifying missing NCs 20, and thus missing communication nodes among the plurality of communication nodes 2a, 2b, 2c, 2d, will be described. Generally, the method is carried out by data processing in the central controller 3, and more specifically by its data processing device 32. Generally, an NC may be considered as missing if it is not reporting back to the central controller 3, for instance if the NC is out of order.

First, in step 100, the central controller 3 receives the above described data from the NCs of the communication nodes of the plurality of communication nodes 2a, 2b, 2c, 2d.

Based on the received data, the central controller 3 in step 101 maintains a first list comprising all reporting NCs, and a second list comprising all NCs present in the lists 10 received from the reporting NCs. The second list thus comprises all NCs reported by a reporting NC as a neighbor NC or communicable NC.

The central controller 3 then in step 102 performs a crosscheck of the first list and the second list. Ideally, the NCs listed in the first list and the second list, respectively, should be identical. However, if the crosscheck reveals that one or more NCs appears only in the second list, this indicates missing or not reporting NCs.

For the identify purpose of missing nodes, precision information is not needed.

Figure 5:
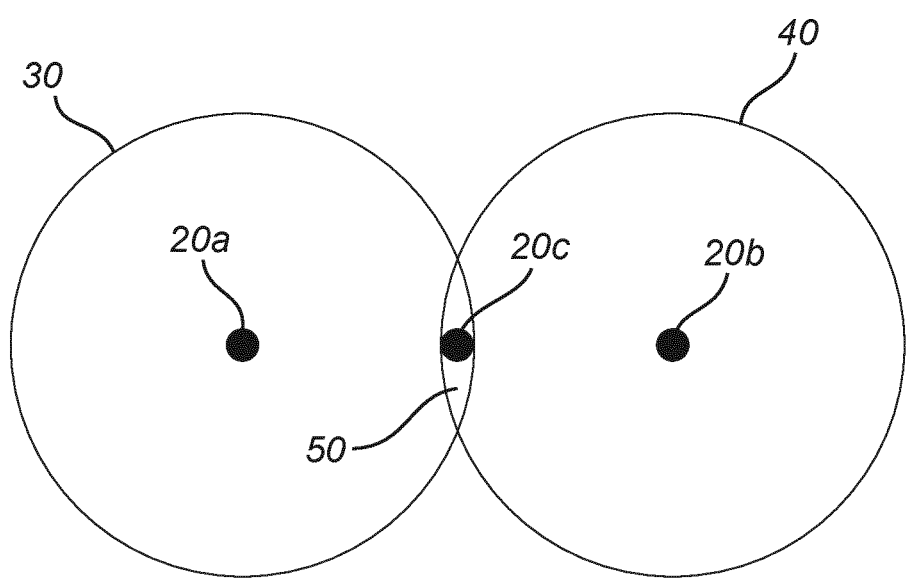
FIG. 5 schematically illustrates an embodiment of the steps for identifying a missing NC among the plurality of NCs.

Based on the thus identified missing NCs, the central controller in step 103 uses an NC having the missing NC as a neighbor to estimate the location of the missing NC. One method for this purpose is illustrated in the diagram of FIG. 5. Here, the central controller 3 places a first NC 20a having the missing NC 20c as a neighbor in the center of a first virtual circle 30 and a second NC 20b having the missing NC 20c as a neighbor in the center of a second virtual circle 40.

The central controller 3 then in step 104 determines the most possible area within which the missing NC 20c is located. Referring to FIG. 5, the central controller 3 determines the overlap area 50 of the first and second virtual circles 30 and 40 circles and deems the thus determined overlap area 50 as being the most possible area within which the missing NC 20c is located.

In case only one NC, say the NC 20a, has the missing NC 20c as a neighbor, the central controller 3 places the NC 20a in the center of a virtual circle 30 and then determines that the periphery of the virtual circle as being the most possible area within which the missing NC 20c is located.

Furthermore, if precision information is also present in in the lists 10 received from the reporting NCs, it may also be possible to calculate a more precise location of the missing NC 20c. This may for instance be done by multi-point positioning.

Now, using the estimated area within which the missing NC 20c is located, the central controller 3 will plot this missing NC 20c, and thus communication node, with a different marker on a map of the plurality of communication nodes. This map may be transmitted to the front-end unit 4 to be shown to the user 5 on an application run on the front-end unit 4. Also, the central controller 3 may enable that the estimated location area of the missing NC 20c may be shown on the map when the user 5 lets a cursor or the like hover over the missing NC 20c.

Furthermore, the central controller 3 may enable a notification of the missing NC 20c be given to the user 5 through the front-end unit 4. The notification may be an acoustic, tactile or visible alarm or a combination thereof. The notification may further comprise an estimated location of the missing NC 20c. The user 5 can then find the missing NC 20c and thereby the communication node, inspect the communication node and perform necessary repairs or resolve other issues. Alternatively, the user 5 can assign a field engineer or worker to inspect the communication node and perform necessary repairs or resolve other issues.

Figure 6:
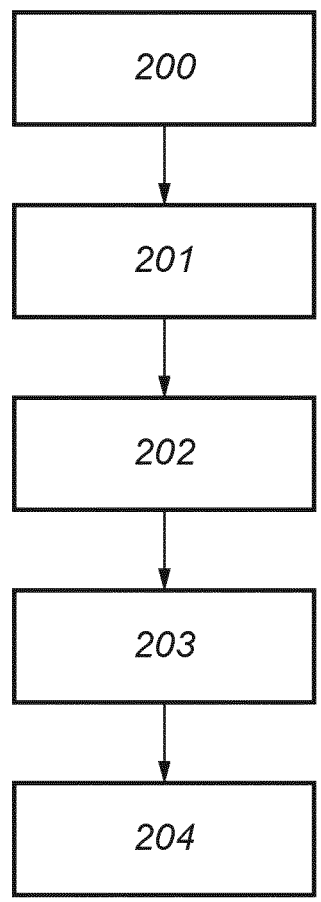
FIG. 6 is a process diagram illustrating an embodiment of the steps for identifying a position drifting NC among the plurality of NCs.

Now, referring to the process diagram of FIG. 6, a method for identifying position drifting NCs 20, and thus position drifting communication nodes among the plurality of communication nodes 2a, 2b, 2c, 2d, will be described. Generally, the method is carried out by data processing in the central controller 3, and more specifically by its data processing device 32.

For instance, GPS accuracy depends on a number of variables, most notably signal to noise ratio (noisy reception), satellite position, weather conditions and obstructions such as buildings and mountains. These factors can create errors in the perceived location. Signal noise usually creates an error from around one to ten meters. Mountains, buildings and other things that might obstruct the path between the receiver and the satellite can cause three times as much error as signal noise. Measurements under real condition have shown that reported GPS location in a city environment can drift very far away from real location.

Generally, an NC may thus be considered as position drifting if it is found to report back to the central controller 3 position information which is deviating from its real position with a larger distance than a predetermined threshold.

The central controller 3 may help to improve the accuracy of the location information of a position drifting NC. This may for instance be done as follows.

First, in step 200, the central controller 3 requests and receives updated data as described above from the NCs of the communication nodes of the plurality of communication nodes 2a, 2b, 2c, 2d.

Next, in step 201, the central controller 3 retrieves the currently applicable near-field settings (e.g. hops, radio transmission power), and the applicable optimal local communication range of the NCs (e.g. 300 m or 200 m).

Figure 7:
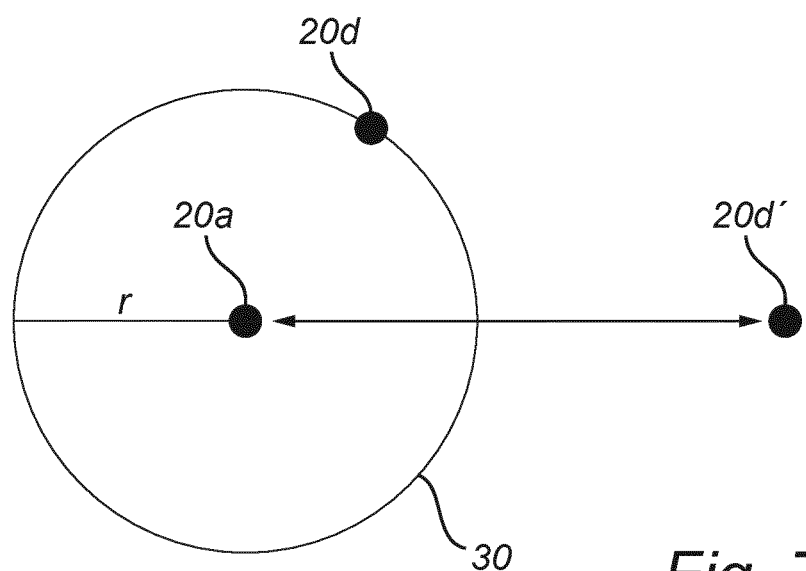
FIG. 7 schematically illustrates an embodiment of the steps for identifying a position drifting NC among the plurality of NCs.

The central controller 3 then in step 202 selects those NCs, e.g. the NC 20a shown in the diagram of FIG. 7, which are deemed to have good remote communication conditions, e.g. satellites in view and good SNR data reported.

The central controller 3 then in step 203 selects each NC suspected of erroneous position, in FIG. 7 the NC 20d, in the list of neighbor NCs of the NC 20a and calculates a distance from the NC 20d to the NC 20a. These calculations may be performed by means of algorithms known per se, such as those available on the website of Movable Type Scripts.

The central controller 3 then in step 204 determines whether the calculated distance is smaller than the local communication range or not. In FIG. 7, the radius of the circle 30 in the center of which the NC 20a is placed illustrates the local communication range. If the calculated distance is smaller than or equal to the local communication range the position information is deemed accurate by the central controller 3. If on the other hand the calculated distance is larger than the local communication range, which would be the case if the NC 20d in FIG. 7 had reported a position corresponding to the NC 20d' in FIG. 7, the central controller 3 concludes that the NC 20d has reported a wrong or drifting location.

Furthermore, the central controller 3 may enable a notification of the position drifting NC 20b be given to the user 5 through the front-end unit 4. The notification may be an acoustic, tactile or visible alarm or a combination thereof. The notification may further comprise an estimated location of the position drifting NC 20d and/or a notification on the wrong location.

The user 5 can then find the position drifting NC 20d and thereby the communication node, inspect the communication node and perform necessary repairs or resolve other issues, such as particularly check and correct the position information with comparison of map or third part GPS tools. Alternatively, the user 5 can assign a field engineer or worker to inspect the communication node and perform necessary repairs or resolve other issues, such as particularly check and correct the position information with comparison of map or third part GPS tools.

Alternatively, the central controller 3 may help to improve the accuracy of the location information of a position drifting NC 20 by randomly choosing a NC 20 as an anchor NC, and calculate a GPS distance and a radio distance for the chosen anchor NC, then choosing a next NC as an anchor NC and repeating the calculation of a GPS distance and a radio distance for the next NC, subsequently repeating this procedure for a suitable number of NCs, possibly all NCs, and finally based on the calculations performed determine which NC is position drifting. This may be done based on that if a NC is position drifting, its GPS distances to all of its neighboring NCs are not corrected, and if a NC is not position drifting, its GPS distances to some of its neighboring NCs may be corrected, but to one of its neighboring NC its GPD distance may not be corrected.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A central controller for remote communication with a plurality of network controllers (NC), the plurality of NCs being provided in communication nodes and being configured for near field communication with each other, the central controller being configured to be in communicative connection with each NC of the plurality of NCs, the central controller comprising:
   a data processing device connected to a communication module, wherein the data processing device processes and analyzes information received from the communication module;
   wherein the central controller is configured to:
      receive ID information, position information and a list of communicable neighboring NCs from each NC of the plurality of NCs,
      maintaining a list of reporting NCs,
      maintaining a further list of NCs based on the received lists of communicable neighboring NCs,
      crosschecking the list and the further list to identify NCs appearing only in the further list and thereby indicating missing or not reporting NCs,
      receive precision information from each NC of the plurality of NCs,
      based on the received ID information, position information and precision information and the received lists of communicable neighboring NCs identify at least one NC of the plurality of NCs as providing accurate position information and use the thus identified NC as an anchor point NC, and
      identify position drifting NCs by analyzing the received ID information, position information and precision information and the received lists of communicable neighboring NCs.

2. The central controller according to claim 1, wherein the central controller further is configured to any one or more of:
   control the anchor point NC to allow one, two or three hops,
   control each NC to provide the list of communicable neighboring NCs to the central controller, and
   trigger a warning or alarm on an NC identified as missing or position drifting.

3. The central controller according to claim 1, wherein the precision information comprises any one or more of a Received Signal Strength Indicator, RSSI, between the anchor point and a neighboring NC, a number of satellites visible to the NC and a signal-to-noise ratio, SNR.

4. The central controller according to claim 1, wherein the central controller is further configured to estimate the location of the missing NC by:
   making an NC having the missing NC as a neighboring NC the center of a virtual circle, determine the periphery of the virtual circle, and deeming the periphery the area of the position of the missing NC, or
   making two or more NCs having the missing NC as a neighboring NC the center of a respective virtual circle, determine the overlap area of the said respective virtual circles, and deeming the determined overlap area the area of the position of the missing NC.

5. The central controller according to claim 1, wherein the central controller is further configured to identify a position drifting NC by:
   requesting and receiving updated position information, precision information and list of communicable neighboring NCs from each NC of the plurality of NCs,
   retrieving near-field settings and local communication range of each NC of the plurality of NCs,
   select at least one NC in the list of communicable neighboring NCs of the anchor point NC,
   calculate the distance of at least one NC in the list of communicable neighboring NCs to the anchor point NC,
   determine whether the calculated distance of the at least one NC is smaller than the local communication range of the at least one NC, and
   if the calculated distance of the at least one NC is not smaller than the local communication range of the at least one NC determine that the at least one NC is position drifting.

6. The central controller according to claim 1, wherein the central controller is a back-end unit, the plurality of communication nodes is a plurality of luminaires and the plurality of NCs is a plurality of luminaire controllers (LCs).

7. A lighting control system comprising:
   the central controller according to claim 1, and
   the plurality of communication nodes and the plurality of network controllers (NC), each communication node of the plurality of communication nodes comprising an NC of the plurality of NCs, wherein each NC of the plurality of NCs is configured for:
      remote communication with the central controller, and
      near field communication with other NCs of the plurality of NCs,
   wherein each NC of the plurality of NCs further is configured to:
      receive ID information and position information from neighboring NCs of the plurality of NCs by near field communication,
      based on the received ID information and position information, keep a list of communicable neighboring NCs, provide the list of communicable neighboring NCs to the central controller by remote communication, and provide ID information and position information relating to the NC itself to the central controller by remote communication.

8. The lighting control system according to claim 7, wherein each NC of the plurality of NCs is further configured to:

receive precision information from neighboring NCs of the plurality of NCs by near field communication, based on the received ID information, position information and precision information, keep the list of communicable neighboring NCs, provide the list of communicable neighboring NCs to the central controller by remote communication, and provide ID information, position information and precision information relating to the NC itself to the central controller by remote communication.

9. The lighting control system according to claim 7, wherein each NC of the plurality of NCs comprises:

a first communication module configured for remote communication with the central controller, second communication module configured for near field communication with other NCs of the plurality of NCs, and a microcontroller unit, wherein the microcontroller unit of each NC of the plurality of NCs is configured to:

by means of the first communication module receive ID information, position information and precision information from neighboring NCs of the plurality of NCs by means of near field communication, based on the received ID information, position information and precision information, keep a list of communicable neighboring NCs, and by means of the second communication module provide the list of communicable neighboring NCs as well as ID information, position information and precision information relating to the NC itself to the central controller.

10. A method for identifying missing network controllers (NC) the plurality of NCs being provided in communication nodes and being configured for near field communication with each other, the method comprising:

receiving ID information, position information and a list of communicable neighboring NCs from each NC of the plurality of NCs, maintaining a list of reporting NCs, maintaining a further list of NCs based on the received lists of communicable neighboring NCs, crosschecking the list and the further list to identify NCs appearing only in the further list and thereby indicating missing or not reporting NCs, receiving precision information from each NC of the plurality of NCs, based on the received ID information, position information and precision information and the received lists of communicable neighboring NCs identifying at least one NC of the plurality of NCs as providing accurate position information and using the thus identified NC as an anchor point NC, and identifying position drifting NCs by analyzing the received ID information, position information and precision information and the received lists of communicable neighboring NCs.

11. The method according to claim 10, further comprising the following performed by each NC of the plurality of NCs:

receiving ID information and position information from neighboring NCs of the plurality of NCs by near field communication, based on the received ID information and position information, keeping a list of communicable neighboring NCs, providing the list of communicable neighboring NCs to the central controller by remote communication, and providing ID information and position information relating to the NC itself to the central controller by remote communication.

12. A non-transitory computer readable medium comprising instructions, the instructions when executed by a processor of a computing device cause the processor to perform the method of claim 10.

* * * * *